March 12, 1940.　　　D. P. HYNES　　　2,193,132
HOOD LATCH
Filed July 11, 1938　　　6 Sheets-Sheet 2
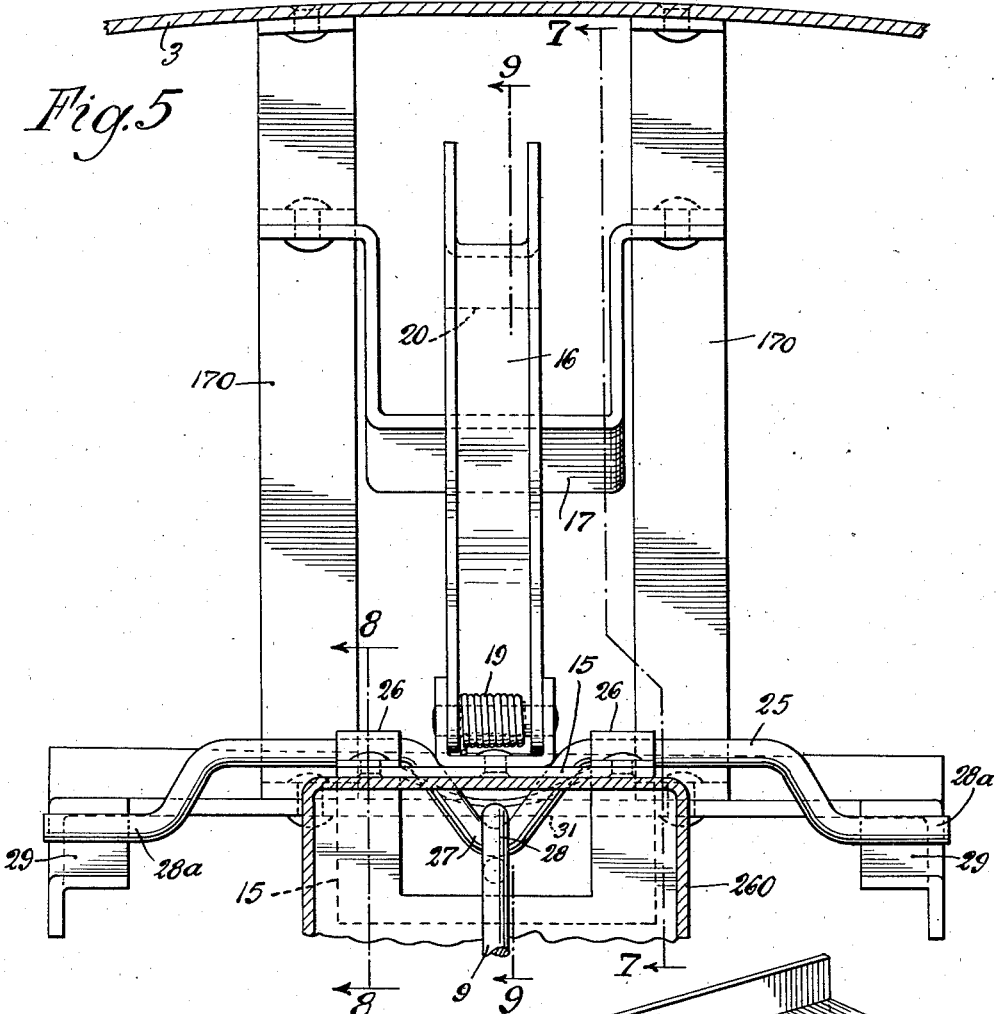
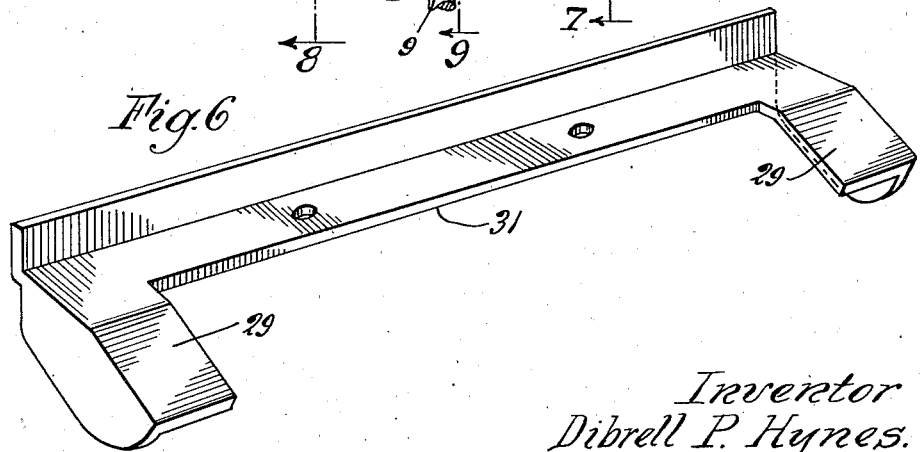
Inventor
Dibrell P. Hynes.
by Parker & Carter
Attorneys March 12, 1940. D. P. HYNES 2,193,132
HOOD LATCH
Filed July 11, 1938 6 Sheets-Sheet 3

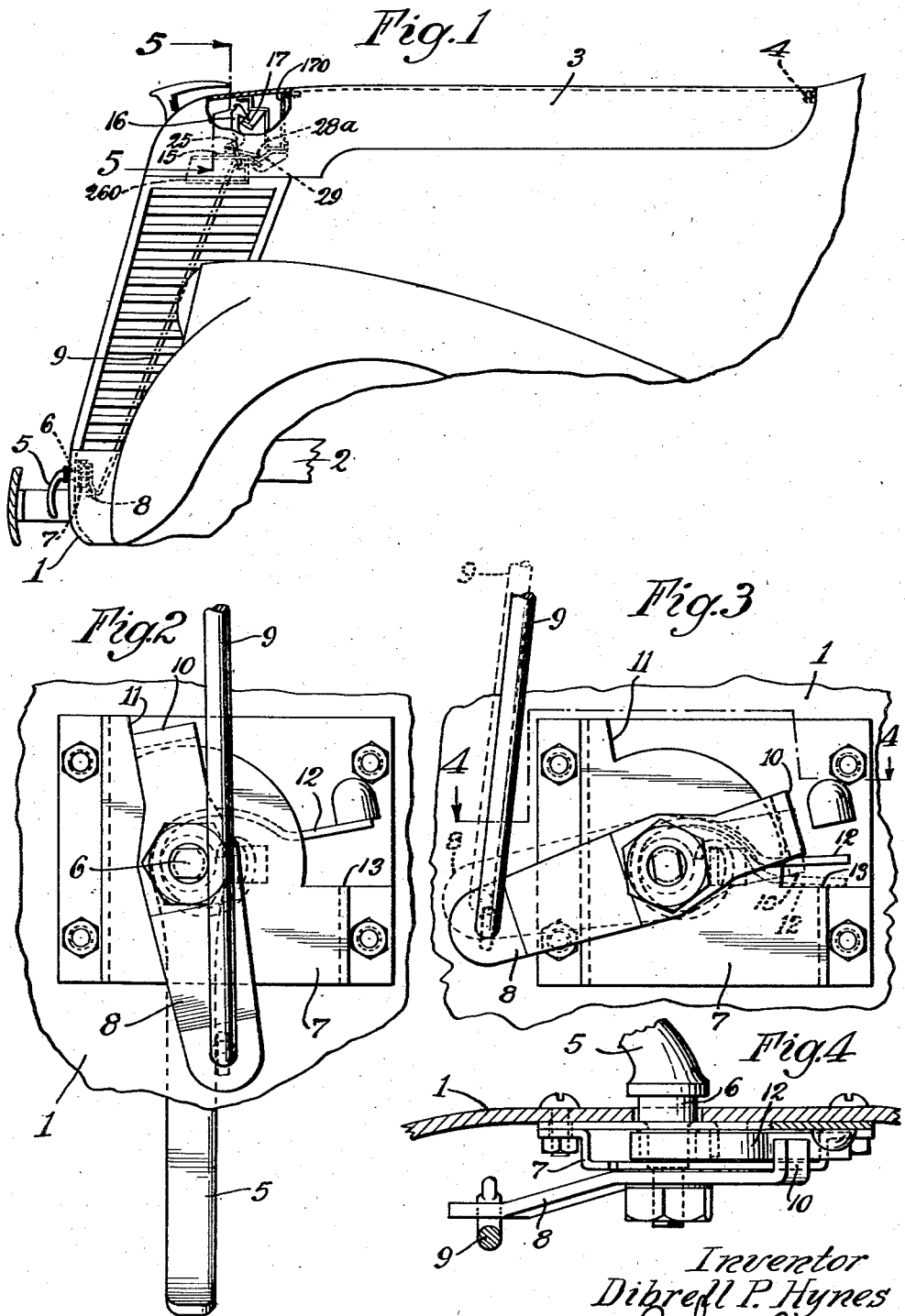

Inventor
Dibrell P. Hynes
by Parker & Carter
Attorneys.

March 12, 1940. D. P. HYNES 2,193,132
HOOD LATCH
Filed July 11, 1938 6 Sheets-Sheet 4

Inventor
Dibrell P. Hynes
by Parker & Carter
Attorneys.

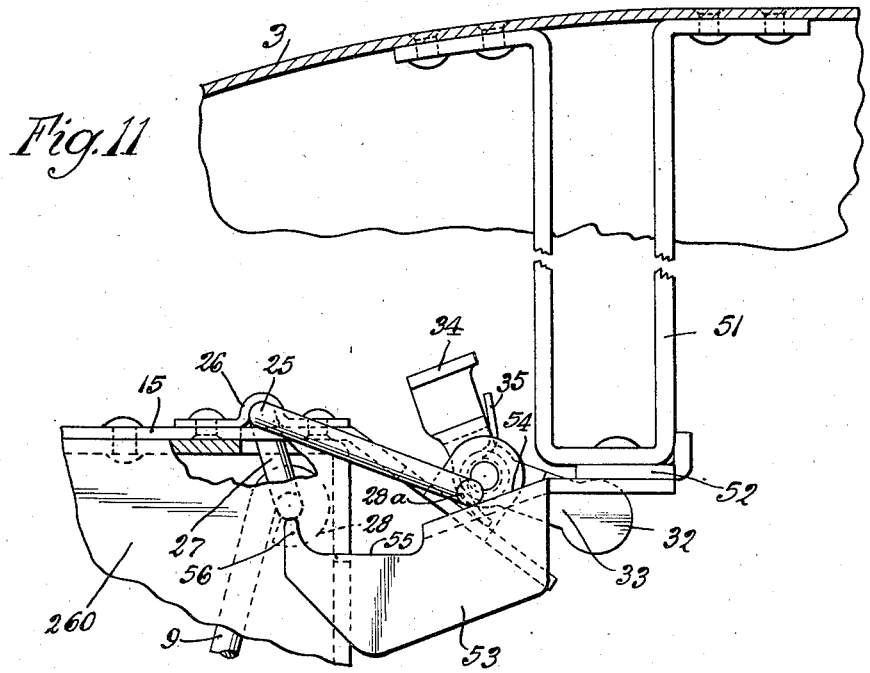
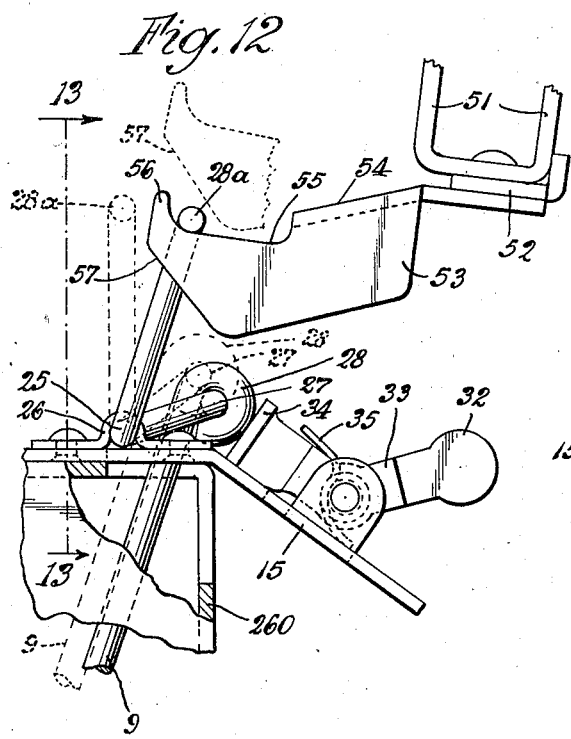
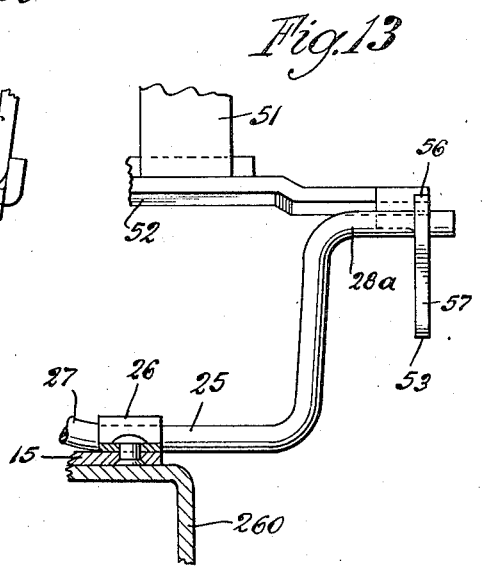

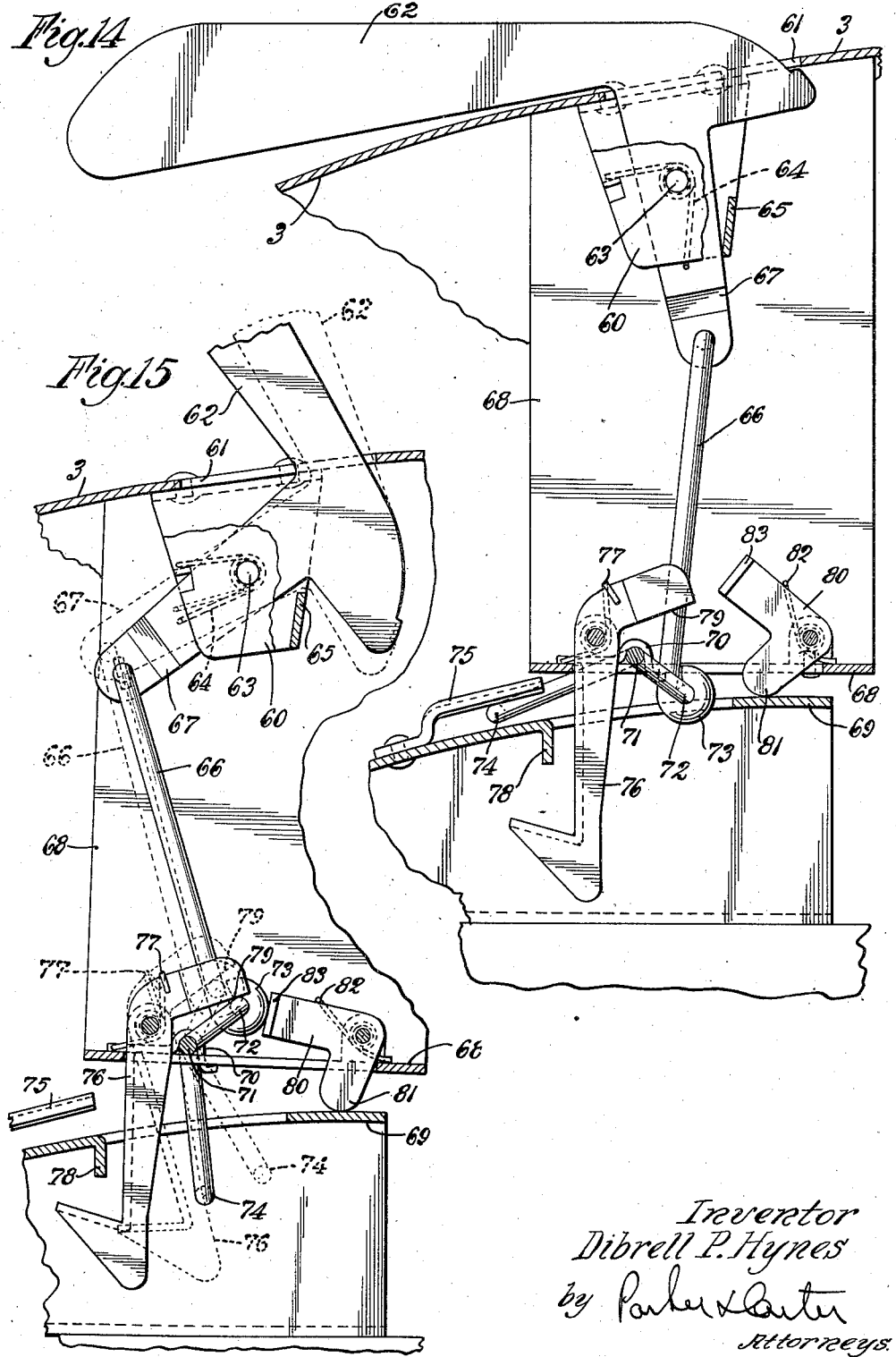

Patented Mar. 12, 1940

2,193,132

UNITED STATES PATENT OFFICE 2,193,132

HOOD LATCH

Dibrell P. Hynes, Evanston, Ill., assignor to Chicago Forging & Manufacturing Co., Chicago, Ill., a corporation of Illinois Application July 11, 1938, Serial No. 220,657

13 Claims. (Cl. 292—11)

My invention relates to improvements in automobile hood latches and is especially adapted for use in connection with top panel front opening automobile hoods wherein the panel is pivoted at the rear and opens from the front.

One object of my invention is to provide a hood latch which will have associated with it a safety catch, thereby preventing blowing open of the hood if the main latch should fail to function or become released.

Another object is to provide manually controlled means whereby both the normal hood latch and the safety catch may be operated.

Another object is to provide means which will automatically insure that the hood latch cannot be operated until the panel and associated parts are in such position that manual operation will result in proper locking.

In general, I provide a hand controlled member at the front end of the automobile vehicle at a point below the place where the top panel is seated when closed. An operating connection extends within the automobile body from the hand control to a latch located adjacent the seat of the panel.

Associated with the latch is a safety catch which always remains in position to limit opening movement of the panel except when positively released, so that if for any reason the usual hood latch would let go or should not be fully latched and the panel be blown up by the wind, the safety catch would engage it after a limited excursion and hold it against further movement.

The operating connection between the hand lever and the latch will, when the hand lever is shifted to the full open position, both disengage the latch and throw the safety catch out of line of engagement. When this is done, automatic means are provided which will lock the latch in open position, with the hand lever held in the disengaged position until downward movement of the panel has extended to a point where the panel is seated and in the fully closed position. When the panel is again seated, the lockout is released and it is then possible for the operator to move the handle to the locked position.

My invention is illustrated more or less diagrammatically in the accompanying drawings, wherein—

Figure 1 is a side elevation in part section of the front end of an automobile using my latch;

Figure 2 is a detail view of the inner side of the hand controlled portion of the hood latch showing the latch in engaged position;

Figure 3 is a similar view to Figure 2 showing the latch in disengaged position;

Figure 4 is a section along the line 4—4 of Figure 3;

Figure 5 is a section on an enlarged scale through the line 5—5 of Figure 1;

Figure 6 is a perspective of the cam abutting supporting bracket;

Figure 11 is an elevation in part section showing a modified form of the device;

Figure 12 is a detail view showing the parts illustrated in Figure 11 in a different position;

Figure 13 is a section along the line 13—13 of Figure 12;

Figure 14 is a detail section showing a further modified form of the device in the locking position;

Figure 15 shows the device of Figure 14 in the unlocked position.

Like parts are indicated by like characters throughout the specification and drawings.

Figure 7:
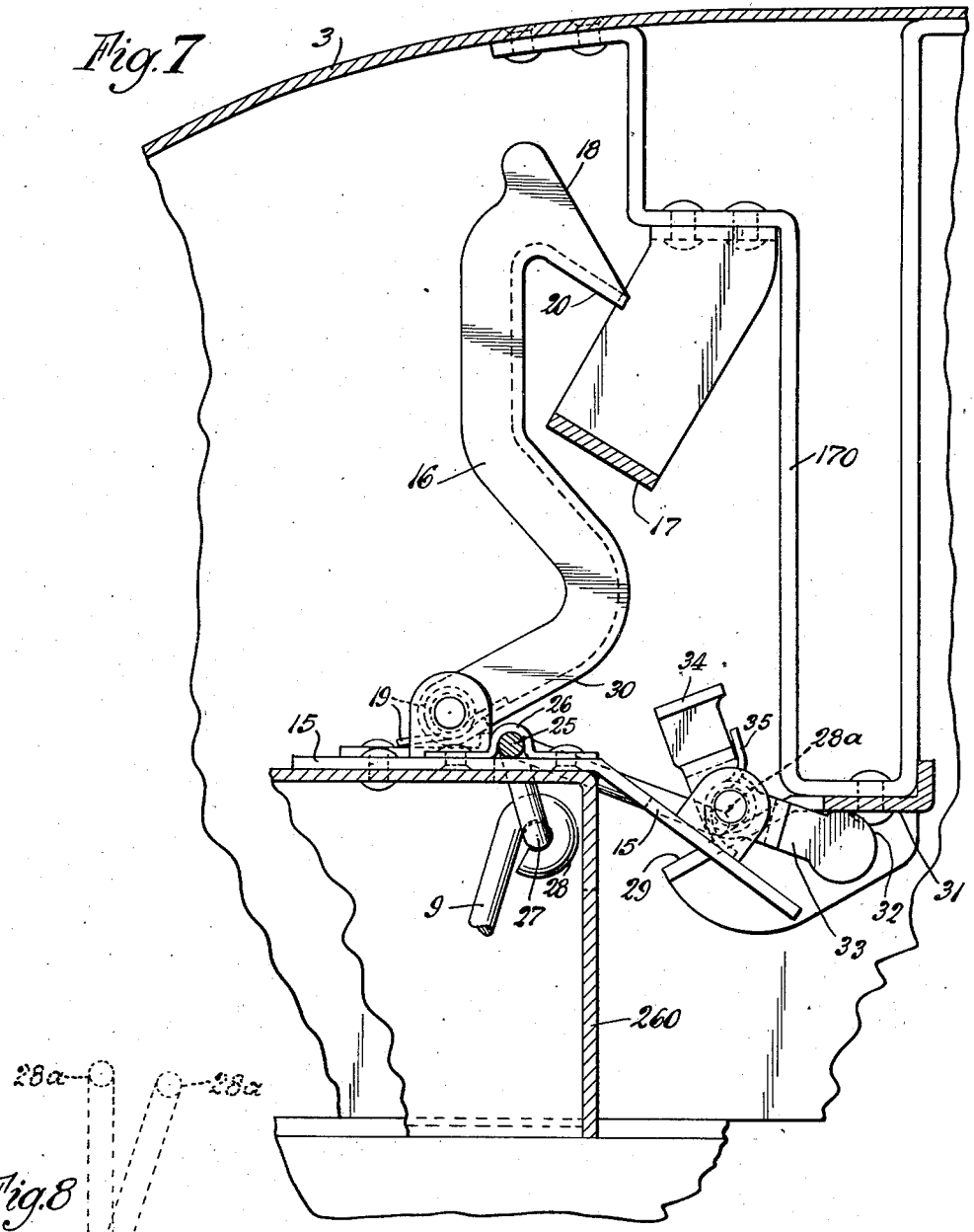
Figure 7 is a section along the line 7—7 of Figure 5.
Figure 8:
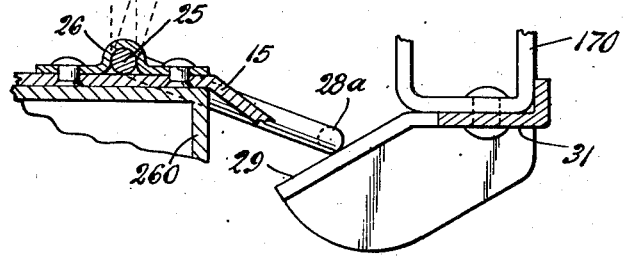
Figure 8 is a section along the line 8—8 of Figure 5 showing a slightly different position of the parts from Figure 7.
Figure 9:
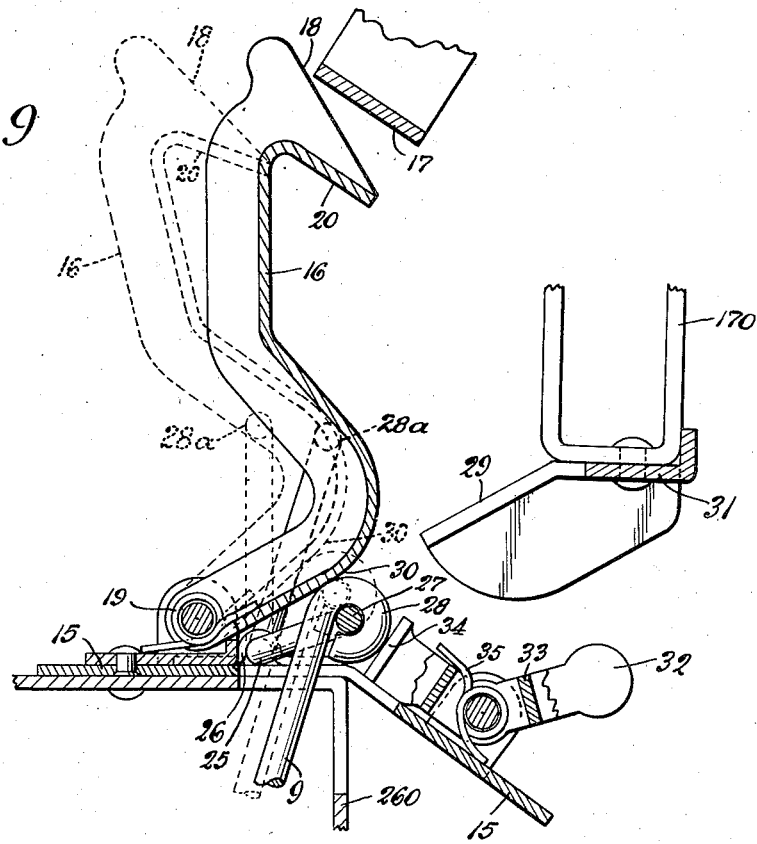
Figure 9 is a section along the line 9—9 of Figure 5.
Figure 10:
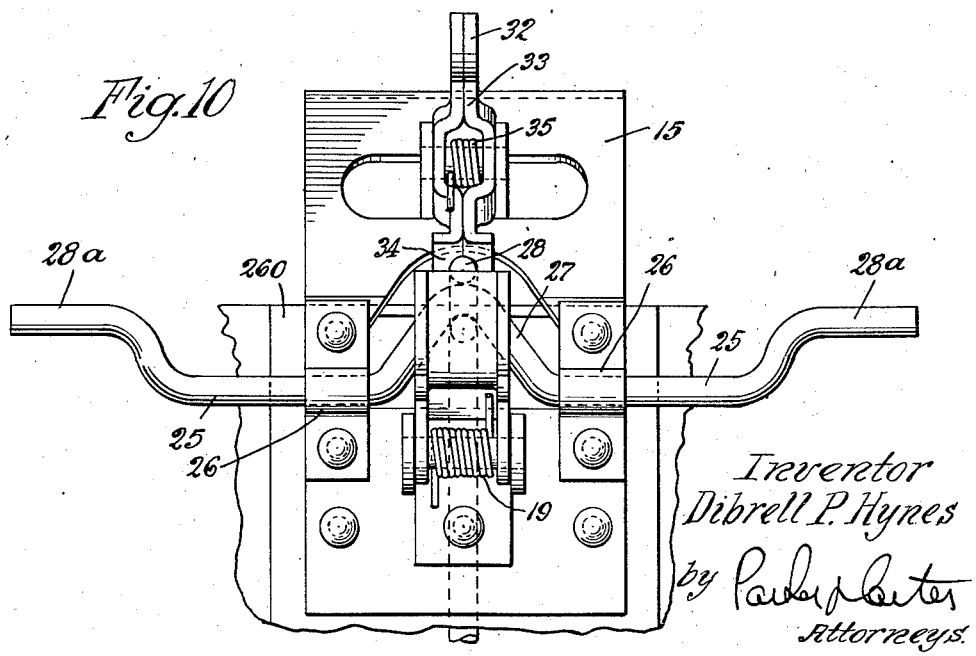
Figure 10 is a plan view of part of the mechanism shown in Figure 9.

1 is the automobile radiator grill or apron, a part of the body. 2 indicates the vehicle frame. 3 is the top panel or hood, pivoted at 4, at the rear end. 5 is a hand lever projecting from a lock spindle 6, which spindle extends inwardly through the grill or apron and is rotatably mounted therein. 7 is a bracket assisting in supporting the spindle. 8 is a crank rigidly mounted on the spindle 6. 9 is a connecting rod extending from the lever upwardly inside the grill or apron to the latch.

10 is a stop arm extending from the spindle 6, in a direction opposite to the crank 8. It is adapted to engage an abutment 11, when in the locked position. This abutment is so positioned that the tension on the rod 9 holds the lug 10 against the abutment 11 in locked position. 12 is a spring in the path of the lug 10. 13 is an abutment which limits the movement of the crank in the unlocking position. When the lever 5 is manipulated to rotate the crank 8 in a clockwise direction, referring to the parts as illustrated in Figures 2 and 3, the part 10 unseats from the abutment 11, the crank moves to the left and the connecting rod 9 is forced upwardly.

This continues until the lug 10 engages the spring 12. Further movement of the lug 10, by manipulation of the crank 8, by engagement of the lever 5, causes the lug 10 to compress the spring 12, and when the lug 10 and spring 12 are against the abutment 13, the spring 12 will remain in compressed position.

When the lug 10 rests against the abutment 13, the hood latch controlled by the handle 5 is in the completely open position, both the automatic safety latch and the main positive latch being free. The spring 12, however, as soon as the operator releases the handle 5, raises the lug 10 off the abutment 13 and moves the parts into the position where the automatic safety catch is permitted to return to the locking position without any effect whatever upon the main positive hood latch.

15 is a bracket upon which the hood latch itself is mounted. Upon this bracket is pivoted the safety latch hook 16, adapted to engage with a safety latch abutment 17, supported on a frame 170, depending from the hood. The hook has a cam surface 18, adapted to be engaged by the underside of the abutment 17 as it comes down to rotate the hook to the left to permit the abutment to pass below the end of the hook. 19 is a spring which permits the hook to yield and snaps it back into position above the abutment 17. In closed position the abutment 17 is located a few inches below the hook. The abutment 17 and the abutment engaging portion 20 are inclined so as to provide a positive hook action so that if the hood latch is not otherwise fastened and blows open, the abutment 17 and the surface 20 on the hook interlock, positively preventing opening beyond a predetermined point.

Pivoted on the bracket 15 is a positive hood latch crank 25 supported in bearings 26 on a frame 260, which projects upwardly from the vehicle frame. The offset central portion 27 of this crank located between the bearings 26 is engaged by an eyelet 28 on the upper end of the connecting rod 9 so that manipulation of the handle 5 causes rotation of the crank. The two ends of the latch crank are offset as at 28—a, to engage positive lock abutments 29 adjacent each side of the vehicle hood on the bracket 31, and when the handle is in the locking position, the latch crank normally engages at both ends with the abutments on the hood and holds it in closed or seated position. When the handle is in the full open position with the lug 10 against the stop 13, the eyelet 28 which engages the cam surface 30 on the automatic safety hook 16 moves up to swing the hook in a counter-clockwise direction, throwing it out of line with the abutment 17, so that the hood can be opened but as soon as the operator releases his hold on the handle, the spring 12 rotates the lever sufficiently to allow the eyelet to come down and permit the spring 19 to move the automatic latch hook into the operative position.

The bracket 31 is supported on the frame 170. As the hood comes down to the seated position, this bracket engages a cam member 32, on one end of the safety lever 33, rotates it in a clockwise direction and moves the safety stop 34 out of contact with the eyelet 28, so that the eyelet 28 and the crank 25 may rotate in a clockwise direction to cause engagement of the main hood latch. Until this safety lever 33 has been rotated, it remains held by the spring 35 in position in the path of the eyelet 28, so that it is impossible to rotate the hand lever into the locking position. The purpose of this is, of course, to insure that the user will not think that he has locked the hood by a mere rotation of the crank when in fact the hood was not in position such that it could be latched.

These various elements insure first, that whenever the hood is lowered, it is automatically caught; second, that until it is lowered into a position where it can be latched, it is impossible to manipulate the hand lever to complete the latching operation; and third, when the hood is seated, it becomes possible for the operator to latch the hood so that the hood is held positively closed and also remains in such relationship with the automatic latch that if for any reason the hood latch should fail to hold, the hood cannot be blown wide open.

In the modified form shown in Figures 11 to 13, inclusive, 51 are frame members depending downwardly from the hood 3. They support a cross bracket 52 at each end of which are mounted latch members 53, having inclined latch or locking cam surfaces 54, hook pockets 55, and hook points 56. Mounted on the frame 260 is a bracket 15, which depends downwardly and rearwardly from the frame 260, toward the position of the frame 51. Resting on the bracket 15, and so supported by the frame 260, are bearings 26 which support the hood latch crank 25. The offset central portion 27 is located between the bearings 26 and is engaged by the eyelet 28 on the upper end of the connecting rod 9, just as in the other form previously described. When the crank or latch arms 28—a are rotated in a clockwise direction as shown in Figure 11, they engage the surface 54 and lock the hood in latched position. If by accident, the hood should blow open, as for instance, vibration or other cause should swing the arm 8 from its position shown in Figure 2 in a clockwise direction until the line of tension of the connecting rod passes to the left of the center of the spindle 6, and so would be initially in an unlocked position, any upward movement of the hood 3 might cause the latch members 54 to slide out from under the latch members 28—a and would immediately cause those ends to be caught in the hook pocket 55, being held against movement in a counterclockwise direction sufficient to disengage by the hook points 56. Thus in this case the same latch members on the hood provide both the positive hook lock and the automatic hood lock effect. It will be understood, of course, that if the hood is in the down or closed position and the members 28—a rotate in a counterclockwise direction, they will ultimately assume the dotted line position shown in Figure 12 at which time the hood may be opened but they only assume this position when the spring 12 is compressed and as soon as the operator lets go of the handle 5 the spring 12 rotates the hand crank from the dotted line position of Figure 3, which corresponds to the dotted line position of Figure 12, to the full line position of Figure 3, corresponding to the full line position of Figure 12. In this position, if the hood is open, and is closed, the cam surface 57 will engage the member 28—a and throw it to the left sufficient to permit the hood to seat, whereupon the spring 12 will return the member 28—a to the preliminary interlock position. The bracket 15 carries the same automatic interlock as discussed in connection with the preferred form so that in both forms it is impossible to rotate the hand lever into the locking position until hood is in such position that locking may be effected.

In the further modified forms in Figures 14 and 15, 60 is a supporting frame on the underside of the hood 3. The hood is slotted at 61. 62 is a handle on the pivot pin 63 in the frame 60. 64 is a spring adapted to be compressed when the handle is rotated in a clockwise direction. 65 is an abutment or stop on the frame 60, adapted to limit the movement of the handle both in clockwise and counterclockwise direction. 66 is a control rod extending downwardly from the lever 67, integral with the handle 62. 68 is a latch frame extending downwardly from the hood 3. 69 is a latch frame mounted on the vehicle body. 70 is a bearing on the frame 68, carrying a hood latch crank 71 having a central offset 72 engaged by an eyelet 73 on the lower end of the connecting rod 66. The crank or latch ends 74 of the hood latch crank 71 are adapted to engage under cam members 75 on the frame 69, to lock the hood down when in the position shown in Figure 14. When in the position shown in Figure 15, the hood latch is unlocked. 76 is a safety hook pivoted on the frame 68. The spring 77 tends to rotate the hook in a clockwise direction. 78 is an abutment adapted to be engaged by the hook so that if the main latch should become disengaged when the parts are in the position shown in Figure 14, the hook 76 would engage the abutment 78 and limit the upward movement of the hood. In the position shown in Figure 15, the crank member 72 has engaged the tail 79 of the hook 76, rotated it in a counterclockwise direction in the dotted line position so that it will clear the latch 78, and the hood may be opened. In the full line position, the main latch is disengaged but the automatic hook is in position.

80 is a bell crank pivoted on the frame 68, having a cam surface 81 adapted to engage a part of the frame 6. 82 is a spring tending to rotate this bell crank in a counterclockwise direction. In the position shown in Figure 15, the frame 68 has been raised with the hood sufficiently to permit the spring to swing the bell crank into such position that the abutment 83 engages the eyelet 73 and locks it against rotation in a clockwise direction so that the hand lever is locked in the open position to prevent unadvised effort to latch when the hood is open. In the position shown in Figure 14, this safety latch has been disengaged by contact with the frame 69, so that the hood latch may be operated. It will be understood that the hook 78 is associated with the central portion of the frame 69, and that frame is cut away where the member 75 appears so that there is no interference with the latch cranks 74 as they rotate into and out of locking position.

It will be noted that all of the forms here shown have this in common that the tension or compression on the connecting rod 9 or 66 is applied and maintained by some kind of hand operated locking lever, which lever is thrown beyond dead center so that the spring in the mechanism will maintain it tight and maintain the locking effect and as soon as the hand lever is rotated to move the end of the member 9 or 66 to the opposite side of dead center, that is, to the unlocking side of the axis of rotation of the hand lever, the device is no longer locked and may be released.

I claim:

1. In combination with a hood for vehicle bodies and the like, a manually controlled positive hood latch and an auxiliary automatic hood latch adapted to limit opening of the hood, means associated with the manual control for the positive hood latch for separately releasing the automatic latch when the positive latch is released.

2. In combination with a hood for vehicle bodies and the like, a manually controlled positive hood latch and an auxiliary automatic hood latch adapted to limit opening of the hood, means associated with the manual control for the positive hood latch for separately releasing the automatic latch when the positive latch is released, and means for returning the automatic latch to locking position after the positive latch has been released.

3. In combination with a hood for vehicle bodies and the like, a manually controlled positive hood latch and an auxiliary automatic hood latch adapted to limit opening of the hood, means associated with the manual control for the positive hood latch for separately releasing the automatic latch when the positive latch is released, and yielding means for returning the automatic latch to locking position after the positive latch has been released.

4. In combination with a hood for vehicle bodies and the like, a manually controlled positive hood latch and an auxiliary automatic hood latch adapted to prevent opening of the hood, means associated with the manual control for the positive hood latch for separately releasing the automatic latch when the positive latch is released, and means for returning the automatic latch to locking position after the positive latch has been released, said means including a spring associated with the automatic latch and a spring associated with the manual control for the positive latch.

5. In a latching mechanism for the hood door of an automotive vehicle having a grille at its front end, cooperating means on the front end of the door and on the vehicle over the grille to enable the latching of the hood door when the door is in lowered position, means connected to the last named means and extending to the bottom of the grille, a handle and shaft journally mounted on the vehicle below the grille and connected to said last named means and adapted to move said last named means to operate the latch on the grille to cause the hood door to be latched or unlatched, and means mounted on the grille and preventing the operation of the latching mechanism when the door is in raised position.

6. In a hood latching arrangement wherein an encasing portion of the hood is adapted to be normally latched in closed position by a primary latch mechanism which includes a rotatable crank and locking means carried thereby, an automatic latch, and yielding means tending normally to urge it toward locking position, said automatic latch being located within the hood and bein normally inaccessible from the exterior of the hood, and a connection between said automatic latch and said primary latch mechanism, adapted to move said automatic latch mechanism to releasing position when the primary latch mechanism is released.

7. In a hood latching arrangement wherein an encasing portion of the hood is adapted to be normally latched in closed position by a primary latch mechanism, an automatic latch and yielding means tending normally to hold it in locking position, said automatic latch being located within the hood and normally inaccessible, and an abutment adapted to be opposed to said automatic latch when the encasing portion of the hood is moved to or near closed position, said automatic latch including an inclined portion over which said abutment is adapted to ride, said yielding means being adapted thereafter to return such automatic latch to locking alignment with said abutment.

8. In a hood latching arrangement wherein an encasing portion of the hood is adapted to be normally latched in closed position by a primary latch mechanism, an automatic latch and yielding means tending normally to hold it in locking position, said automatic latch being located within the hood and normally inaccessible, and an abutment adapted to be opposed to said automatic latch when the encasing portion of the hood is moved to or near closed position, said automatic latch including an inclined portion over which said abutment is adapted to ride, said yielding means being adapted thereafter to return such automatic latch to locking alignment with said abutment, said automatic latch being of sufficient length to permit a predetermined opening movement of the encasing portion of the hood prior to an actual locking engagement between the automatic latch and the abutment.

9. In a hood latching arrangement wherein an encasing portion of the hood is adapted to be normally latched in closed position by a primary latch mechanism, auxiliary lock means located entirely within the hood and comprising a hook and an opposed abutment, each having opposed engaging surfaces generally parallel with one another and inclined to the normal direction of the closing or opening movement of the encasing portion of the hood, whereby movement of such portion will bring them into interlocking engagement, and means for normally urging said hook toward locking alignment with said abutment.

10. In a hood latching arrangement wherein an encasing portion of the hood is adapted to be normally latched in closed position by a primary latch mechanism, an automatic latch located within the hood and normally inaccessible from the exterior of the hood, said latch including a hook and an opposed abutment, yielding means for normally moving said hook toward locking alignment with said abutment, and means effective, when the primary latch mechanism is in releasing position, to hold said hook also in releasing position.

11. In a hood latching arrangement wherein an encasing portion of the hood is adapted to be normally latched in closed position by a primary latch mechanism, a frame depending downwardly from the encasing portion of the hood, an automatic hood latch mounted on said frame, fixed latch abutment means separate from the frame, adapted to cooperate with said automatic hood latch, yielding means tending normally to move said automatic latch into latching alignment with said abutment means, and means, responsive to movement of said primary latch mechanism toward release position, adapted to move said automatic latch toward release position.

12. In combination with a hood for vehicle bodies and the like having therewithin a fixed abutment means, a movable latch member, a handle and an operating connection between the handle and the movable latch member, a movably mounted safety hook, yielding means tending normally to urge said hook toward ready position, in relation to said fixed abutment means, and means associated with said latch member adapted to engage said hook when the latch member is moved to inoperative position, and thereby to move said hook also to inoperative position.

13. In a hood latch for vehicles and the like, a latch and means for actuating it, a latch abutment, a hook, a hook abutment in line with said hook, a hook-engaging member mounted for rotation into and out of engagement with said hook, adapted, when in engagement with said hook, to hold said hook in inoperative position, means responsive to movement of the latch for moving said hook-engaging member into inoperative position, and yielding means adapted, when said hook-engaging member is in inoperative position, to urge said hook into operative alignment with the hook abutment.

DIBRELL P. HYNES.